(12) United States Patent
Turner et al.

(10) Patent No.: US 7,019,664 B2
(45) Date of Patent: Mar. 28, 2006

(54) READING PROTOCOL FOR TRANSPONDERS OF ELECTRONIC IDENTIFICATION SYSTEM

(75) Inventors: Christopher Gordon Gervase Turner, Gauteng (ZA); John McMurray, Gauteng (ZA)

(73) Assignee: Supersensor (Proprietary) Limited, Gauteng (ZA)

( * ) Notice: Subject to any disclaimer, the term of this patent is extended or adjusted under 35 U.S.C. 154(b) by 363 days.

(21) Appl. No.: 09/878,403

(22) Filed: Jun. 12, 2001

(65) Prior Publication Data

US 2002/0024422 A1    Feb. 28, 2002

(30) Foreign Application Priority Data

Jun. 12, 2000    (ZA) ................................. 2000/2937

(51) Int. Cl.
*H04Q 5/16* (2006.01)
(52) U.S. Cl. ................... 340/825.52; 340/10.2
(58) Field of Classification Search ............... 340/10.3, 340/10.2, 10.31, 10.33, 10.41, 7.25, 825.49; 370/447, 462
See application file for complete search history.

(56) References Cited

U.S. PATENT DOCUMENTS 5,537,105 A    7/1996  Marsh et al.
5,686,902 A *  11/1997 Reis et al. .................. 340/10.2
5,986,570 A *  11/1999 Black et al. ................ 340/10.2
6,104,279 A     8/2000  Maletsky
6,661,336 B1 * 12/2003 Atkins et al. .............. 340/10.2

FOREIGN PATENT DOCUMENTS

EP    0 689 151 A2    12/1995

* cited by examiner

*Primary Examiner*—Michael Horabik
*Assistant Examiner*—William Bangachon
(74) *Attorney, Agent, or Firm*—Finnegan, Henderson, Farabow, Garrett, & Dunner, L.L.P.

(57) ABSTRACT

A method of reading a plurality of transponders 14.1 to 14.n forming part of an electronic radio frequency identification system 10 comprises the steps of prompting the transponders at 38 to transmit preambles 30 only of respective response digital sequences to a reader 12. The reader then locks onto the preamble 30 transmitted by one of the transponders and immediately causes a mute signal 38 to be broadcast to mute all of the transponders not yet transmitting. The reader then transmits during a first time window 42 a first command 40 to cause the one transponder to transmit a remainder of the sequence. Having received and read the remainder, the reader transmits a second command 44 during a second time window 46 to cause the one transponder to switch to a sleep mode wherein the one transponder no longer transmits any part of the sequence, and to unmute the muted transponders.

20 Claims, 3 Drawing Sheets

READING PROTOCOL FOR TRANSPONDERS OF ELECTRONIC IDENTIFICATION SYSTEM

INTRODUCTION AND BACKGROUND

THIS invention relates to electronic radio frequency (RF) identification systems of the kind comprising a reader and a plurality of transponders. It more particularly relates to a protocol for reading the transponders in sequential manner.

It is well known that the total time required to read all the transponders in a transponder population is proportional to at least the number of transponders in the population and the length of the data stream (frame length) transmitted by each transponder in response to being prompted by the reader. Various schemes and/or protocols have been developed to improve the total read time. These include schemes to avoid collisions between data streams and protocols to switch off transponders already read.

In a first known protocol disclosed in U.S. Pat. No. 5,537,105, once a transponder has been read, it is acknowledged by the reader and switched to a sleep mode wherein it no longer transmits and hence no longer responds to the reader. In this way the number of still active transponders in the population is progressively decreased, thereby progressively reducing the probability of collisions.

A second known protocol is based on the first and in addition utilizes respective randomly generated hold-off periods before the transponders start responding with data frames to a prompt from the reader, thereby to reduce the probability of frame collisions, Furthermore, this protocol also utilizes a mute signal broadcast by the reader to mute all other transponders which would start to respond after a first or selected transponder onto which the reader has locked. However, due to the half duplex nature of these systems, it is not possible to mute those transponders which start responding after the selected transponder, but before the mute signal is received by them. All these non-muted transponders then continue to transmit their full frame lengths of typically 90–130 bits. This clearly results in collisions between the frames, a failure by the reader to read the selected or any other transponder and consequently there is no acknowledgment signal from the reader. The transponders only start retransmitting after a fixed time-out period. Thus, after a collision, the system recovery time is unnecessarily slow.

In a third known protocol, that disclosed in EU 689151 in the name of Kipp, the transponders process respective random hold-off time periods and then transmit a request-to-transmit (RTT) signal. If the reader responds with a first acknowledge signal in a particular time window following the RTT signal transmitted by a transponder, that transponder proceeds to transmit response data. Once this data has been read, the reader responds with a second acknowledge signal which may switch the transponder just read to a sleep mode. The problem with this protocol is that if more than one transponder start to transmit an RTT signal before the first acknowledge signal is received, the RTT signals are corrupted and the time lost is equal to at least the length of the RTT signal and a random hold-off time before a next transponder transmits an RTT signal. Hence, a system operating according to this protocol is vulnerable to corruption of an RTT signal originating from a transponder until the first acknowledge signal is received by the balance of the transponders.

In a fourth known protocol, that disclosed in U.S. Pat. No. 6,104,279 to Maletsky the transponders respond with a header first. The reader having received a header, broadcasts an acknowledge signal within a time window following the header successfully received. The transponder which transmitted the header interprets that acknowledge signal as a go-ahead signal and the other transponders are automatically and simultaneously muted. The problem with this protocol is that if more than one transponder start to transmit a header before the first acknowledge signal is received, the headers corrupt one another and the time lost is equal to at least the length of the header and a random hold-off time before a next transponder transmits a header. Hence, a system operating according to this protocol is vulnerable to corruption of a transmitted header until the acknowledge signal is received by the balance of the transponders.

OBJECT OF THE INVENTION

Accordingly it is an object of the present invention to provide a system, reader, transponder and method of reading the transponders with which the applicant believes the aforementioned disadvantages may at least be alleviated.

SUMMARY OF THE INVENTION

A method of reading a plurality of transponders forming part of an electronic identification system also comprising a reader, the method comprising the steps of:

causing the reader to lock onto a first part of a digital sequence being transmitted by one of said transponders;

causing the reader to broadcast a mute signal to mute all of said transponders not yet transmitting;

causing the reader to transmit a separate first command to cause said one transponder to transmit a remainder of the sequence; and receiving and reading said remainder of the sequence at the reader.

A method as claimed in claim 1 wherein upon receipt and reading of said remainder of the sequence, the reader is caused to transmit a second command to cause said one transponder to switch to a sleep mode wherein said one transponder no longer transmits any part of the sequence and to unmute the muted transponders.

A method as claimed in claim 1 or claim 2 wherein the reader prompts the transponders to transmit respective discrete first parts only of respective digital sequences.

A method as claimed in claim 3, wherein the reader broadcasts a start signal to prompt the transponders.

A method as claimed in claim 4 wherein each transponder transmits the respective first parts of the respective digital sequences after respective hold-off periods after the start signal, A method as claimed in claim 5 wherein the respective hold-off periods are randomly generated periods.

A method as claimed in any one of claims 1 to 6 wherein the mute signal is transmitted while said one of said first parts is still being transmitted.

A method as claimed in any one of claims 1 to 7 wherein the first command is transmitted within a first time window after said one of said first parts has been transmitted.

A method as claimed in any one of claims 1 to 8 wherein the second command is transmitted within a second time window after said remainder of the sequence has been read.

An electronic radio frequency identification system comprising:

a reader;
a transponder population comprising a plurality of transponders to be read by the reader;
the reader comprising a controller, a transmitter for transmitting signals to the transponder population and a receiver for receiving response digital sequences from the transponder population;
the controller being operative to lock onto a first part of a digital sequence being transmitted by one of said transponders;
the controller being operative to cause the transmitter to broadcast a mute signal to mute all of said transponders not yet transmitting;
the controller further being operative to cause the transmitter to transmit a separate first command to cause said one of said transponders to transmit a remainder of the sequence; and
the controller causing the receiver to receive and read said remainder of the sequence.

A system as claimed in claim 10 wherein the controller is operative upon the receiver having received and read said remainder to cause the transmitter to broadcast a second command to cause said one transponder to switch to a sleep mode and to unmute the muted transponders.

A system as claimed in claim 10 or claim 11 wherein the controller is operative to cause the transmitter to prompt the transponders to respond with respective discrete first parts only of respective response digital sequences.

A system as claimed in any one of claims 10 to 12 wherein the transmitter transmits the mute signal while said first part of a digital sequence is being transmitted.

A system as claimed in any one of claims 10 to 13 wherein the first command is transmitted during a first time window after reception by the reader of said one of said first parts.

A system as claimed in any one of claims 11 to 14 wherein the second command is broadcast during a second time window after said remainder has been read by the reader.

A reader for an electronic radio frequency identification system comprising:

a controller; a transmitter for transmitting signals to a transponder population comprising a plurality of transponders; and a receiver for receiving response signals from the transponder population;
the controller being operative to lock onto a first part of a digital sequence being transmitted by one of said transponders;
the controller being operative to cause the transmitter to broadcast a mute signal to mute all of said transponders not yet transmitting;
the controller further being operative to cause the transmitter to transmit a separate first command to cause said one of said transponders to transmit a remainder of the sequence; and
the controller causing the receiver to receive and read said remainder of the sequence.

A transponder for an electronic radio frequency identification system, the transponder comprising:

a modulator for modulating a carrier with response signals;
a demodulator for demodulating command signals; and
a controller for the modulator and demodulator;
the controller being sensitive to a mute command received from a reader and responsive thereto by muting the transponder, and if the mute command is not received, to cause the modulator to modulate the carrier with a first part only of a digital sequence;
the controller further being sensitive to a separate first command signal; and
the controller also being responsive to said first command signal by causing the modulator to modulate the carrier with a remainder of the sequence.

BRIEF DESCRIPTION OF THE ACCOMPANYING DRAWINGS

This invention will now further be described, by way of example only, with reference to the accompanying diagrams wherein.

DESCRIPTION OF A PREFERRED EMBODIMENT OF THE INVENTION

Figure 1:
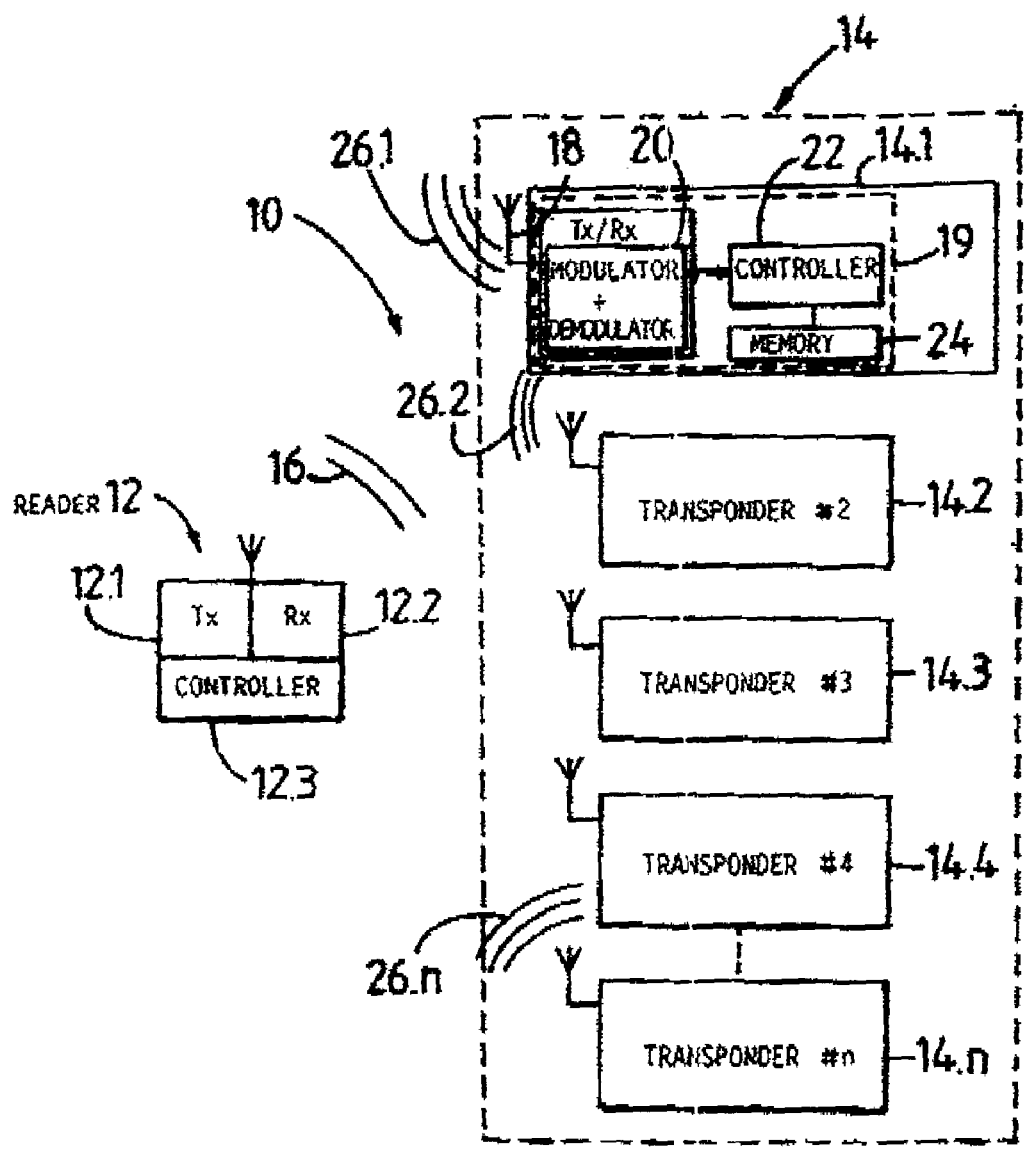
FIG. 1 is a block diagram of an electronic identification system according to the invention.

An electronic radio frequency (RF) identification system according to the invention is generally designated by the reference numeral 10 in FIG. 1.

The system comprises a reader 12 and a transponder population 14 comprising transponders 14.1 to 14.n. The reader comprises a transmitter 12.1, a receiver 12.2 and a controller 12.3 therefor. In use, the transponders may be mounted on or otherwise associated with items or articles (not shown) to be counted or identified. The transponders may be active transponders comprising their own local power supplies. Preferably they are passive transponders in that they derive power to operate from an energizing signal 16 transmitted by the reader. The transponders are similar in configuration and therefore transponder 14.1 only will be described further. Transponder 14.1 comprises an antenna 18, an integrated circuit 19 connected to the antenna and comprising a transmitter and receiver (TX/RX) comprising a modulator and demodulator 20, a controller 22 and a memory arrangement 24. The controller 22 comprises a command decoder and a state machine to interpret and execute commands received from the reader.

The system operates on half-duplex principles and in use, the reader transmits an energizing signal 16 towards the transponder population 14. The transponders derive their power from this signal (as hereinbefore described), transmit respective response signals 26.1 to 26.n by the modulator backscatter modulating the signal serving as carrier in known manner with a digital sequence comprising data prestored in memory arrangement 24. The reader sequentially locks onto one of the response signals and reads the data as will hereinafter be described. Once the population has been read, the aforementioned items are identified and/or counted.

Figure 2:
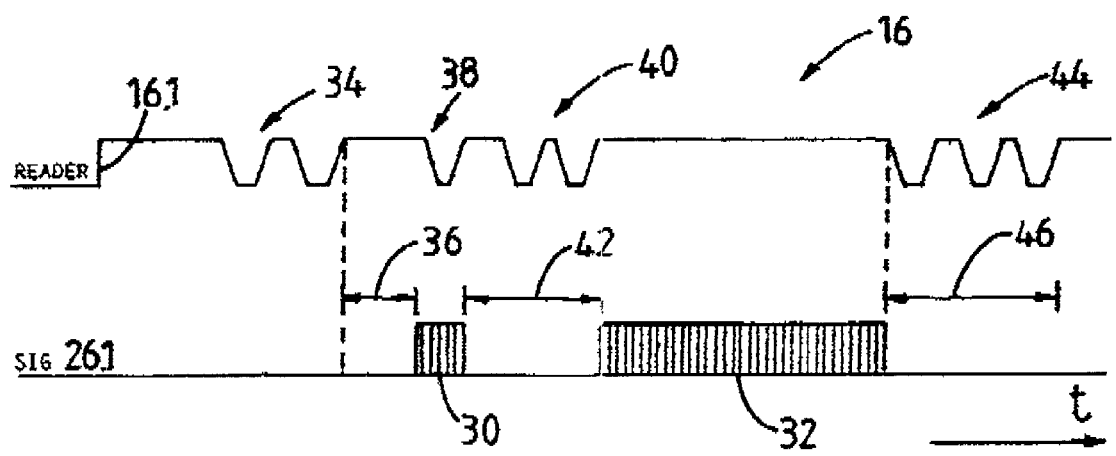
FIG. 2 is a time domain representation (not to scale) of a command modulated energizing signal transmitted by a reader of the system and a response signal from one of the transponders.

The energizing signal 16 with command signals from the reader 12 modulated thereon and one example of a response signal 26.1 are shown in FIG. 2. The response signal 26.1 comprises a digital sequence comprising a preamble 30 of about eleven bits long and a body portion 32 of data of about one hundred and seventeen bits long. Hence, the overall length of the sequence is in the order of 128 bits.

In the method according to the invention, after commencement of the energizing signal 16 at 16.1, the reader broadcasts a "start" command 34 to the entire population. This "start" command causes the transponders to commence processing respective random hold-off periods 36. The hold-off periods may in other embodiments be introduced by application of the energizing signal at 16.1. Hence, in such embodiments the "start" command may not be necessary. At the end of the shortest hold-off period 36, the transponder associated with that hold-off period transmits its preamble 30 only. As soon as the reader has locked onto this preamble, the reader broadcasts a "mute" signal 38 to all the transponders. Due to the half-duplex operation of the system, the transponder transmitting the header does not receive the "mute" signal. However, it is received by all the non-transmitting transponders, which causes them to mute and not to respond to the reader, until they are unmuted by an "unmute" signal. Having locked onto the transmitting or selected transponder, the reader broadcasts a first command signal 40 timed such that it is received by the selected transponder within a first time window 42 following transmission of the preamble, The selected transponder interprets the first command signal as a "go ahead" signal and then transmits the body or a data portion 32 of the sequence. Once the data in the body portion 32 has been read by the reader in known manner, the reader broadcasts a second command signal 44 in a second time window 46 following the body portion 32 and which serves to switch the selected transponder to a sleep mode and as an "unmute" signal for the muted transponders. Thereafter, the procedure is repeated in respect of the unmuted transponders until all the transponders in the population have been read. The purpose of the preamble 30 is merely to enable the reader 12 to lock onto and synchronize with the relevant transponder. In a preferred embodiment of the invention, the preamble does not include any information. In practical systems, the controller 22 locks onto the preamble of a selected transponder within two to three bit periods, so that the "mute" signal can advantageously be transmitted very early on during the transmission of the preamble, to mute as many as possible of the other transponders.

Figure 3:
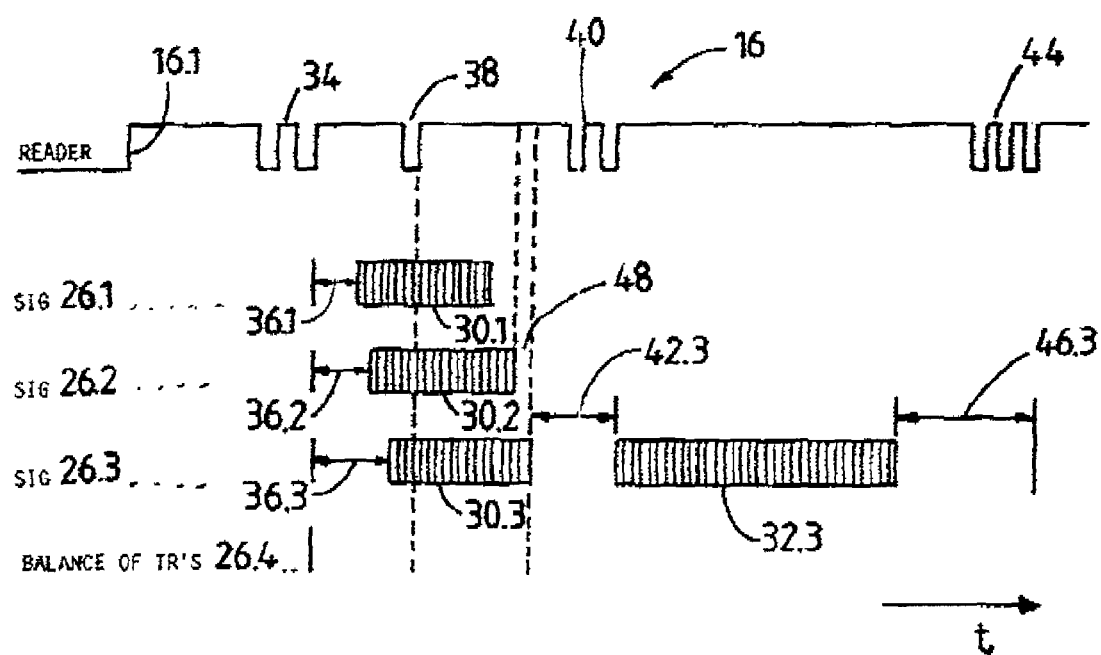
FIG. 3 is a time domain representation (not to scale) illustrating the method according to the invention in more detail.

The operation of the system 10 is further illustrated in FIG. 3. The energizing signal is shown at 16 and the response signals from transponders 14.1 to 14.n are illustrated at 26.1 to 26.4. The first transponder to respond after a random hold-off period 36.1 after the start signal 34, is transponder 14.1 with response signal 26.1. As stated hereinbefore, only preamble 30.1 is transmitted. The reader, having locked onto the preamble 30.1, transmits "mute" signal 38 as soon or early as possible. The signal 38 serves to mute all of transponders 14.4 to 14.n not yet transmitting, so that (as shown at 26.4) no response signal is transmitted by any of them, until they receive an "unmute" signal, such as second command signal 44.

However, it may happen that soon after transponder 14.1, transponders 14.2 and 14.3 also start to transmit preambles 30.2 and 30.3 respectively after respective hold-off periods 36.2 and 36.3. Since each of transponders 14.1, 14.2 and 14.3 are transmitting when the "mute" signal 38 is broadcast by the reader, those transponders would not receive the "mute" signal.

The preambles 30.1, 30.2 and 30.3 collide with each other which results in a corruption of the preambles. However, the tail of preamble 30.3 of transponder 14.3 (the last transponder to have started transmitting) is unaffected during time period 48 and the reader then locks onto this tail. It is known that only a few bit cycles (two or three) of the preamble are required to enable the reader to lock onto the newly selected transponder 14.3.

If the reader 12 property locks onto this tail, a first command 40 is broadcast by the reader timed to fall within the first time window 42.3 associated with transponder 14.3. However, the first command 40 does not fall within the corresponding first time windows associated with transponders 14.1 and 14.2. Due to the aforementioned timing, the first command is interpreted by transponder 14.3 as a "continue" command, so that transponder 14.3 proceeds to transmit the body part 32.3 of its digital sequence. On the other hand, the first command is interpreted as a "mute" command by transponders 14.1 and 14.2, so that they do not transmit the respective body parts of their sequences.

The reader 12 then reads the data in the body part 32.3 in known manner and once the data has been read, the reader broadcasts a second command signal 44, during a second time window 46.3 associated with transponder 14.3. Due to the timing, transponder 14.3 interprets the second command signal as an "end"-command to switch to a sleep mode, while all the muted transponders interpret command 44 as an "unmute" command which cancels the muting of previously muted transponders 14.1, 14.2 and 14.4 to 14.n.

Should two or more transponders simultaneously commence transmitting their preambles, the reader will not lock onto any one of them. The reader therefore does not transmit the first command signal in the first time windows and the transponders accordingly cease transmitting at the end of their respective preambles. The reader 12 then, within a predetermined period (such as sixteen bit periods after having received the start of the first of the preambles) transmits an "unmute" signal to cause all the remaining transponders in the population to retransmit their respective preambles after respective hold-off periods, after receipt of the "unmute" signal, Also, in a case wherein the body 32 of a sequence is not read successfully, the reader 12 transmits an "unmute" signal but not within the second time window, to cause all the transponders not yet read to retransmit their preambles as hereinbefore described.

The first command may for example be any one of the following: send the body 32 of the data as hereinbefore described; resend the preamble 30; send a base block (32 bits for example) of data only; send a base page (128 bits for example) of data only; send a designated block or page of data only; and a mute command.

The second command may for example be any one of the following: send a designated block or page of data; write a block or page of data to a designated address in a memory arrangement 24 of the transponder; and an "end" command which causes the transponder just read to be switched to a steep mode and to unmute the muted transponders, as hereinbefore described.

It will be appreciated that there are many variations in detail on the invention herein defined and described without departing from the scope and spirit of the appended claims.

What is claimed is:

1. A method of reading a plurality of transponders forming part of an electronic identification system also comprising a reader, the method comprising the steps of:
   causing the reader to lock onto a first part of a digital sequence being transmitted by one of said transponders;
   causing the reader to broadcast a mute signal immediately to mute all of said transponders not yet transmitting;

causing the reader to transmit a separate first command to cause said one transponder to transmit a second part of the digital sequence; and receiving and reading said second part of the digital sequence at the reader.

2. A method as claimed in claim 1 wherein upon receipt and reading of said second part of the digital sequence, the reader is caused to transmit a second command to cause said one transponder to switch to a sleep mode wherein said one transponder no longer transmits any part of the digital sequence and to unmute the muted transponders.

3. A method as claimed in claim 1 wherein a reading cycle is started by the reader prompting the transponders to transmit respective discrete first parts only of respective digital sequences.

4. A method as claimed in claim 3 wherein the reader broadcasts a start signal to prompt the transponders.

5. A method as claimed in claim 4 wherein each transponder transmits the respective first parts of the respective digital sequences after respective hold-off periods after the start signal.

6. A method as claimed in claim 5 wherein the respective hold-off periods are randomly generated periods.

7. A method as claimed in claim 1 wherein the mute signal is transmitted while said one of said first parts is still being transmitted.

8. A method as claimed in claim 1 wherein the first command is transmitted within a first time window after said one of said first parts has been transmitted.

9. A method as claimed in claim 2 wherein the second command is transmitted within a second time window after said second part of the digital sequence has been read.

10. An electronic radio frequency identification system comprising:

reader;

a transponder population comprising a plurality of transponders to be read by the reader;

the reader comprising a controller, a transmitter for transmitting signals to the transponder population and a receiver for receiving response digital sequences from the transponder population;

the controller being operative to lock into a first part of a digital sequence being transmitted by one of said transponders;

the controller being operative to cause the transmitter to broadcast a mute signal immediately to mute all of said transponders not yet transmitting;

the controller further being operative to cause the transmitter to transmit a separate first command to cause said one of said transponders to transmit a second part of the digital sequence; and the controller causing the receiver to receive and read said second part of the digital sequence.

11. A system as claimed in claim 10 wherein the controller is operative upon the receiver having received and read said second part to cause the transmitter to broadcast a second command to cause said one transponder to switch to a sleep mode and to unmute the muted transponders.

12. A system as claimed in claim 10 wherein the controller is operative to cause the transmitter to prompt the transponders to respond with respective discrete first parts only of respective response digital sequences.

13. A system as claimed in claim 10 wherein the transmitter transmits the mute signal while said first part of a digital sequence is being transmitted.

14. A system as claimed in claim 10 wherein the first command is transmitted during a first time window after reception by the reader of said one of said first parts.

15. A system as claimed in claim 10 wherein the second command is broadcast during a second time window after said second part has been read by the reader.

16. A reader for an electronic radio frequency identification system comprising:

a controller; a transmitter for transmitting signals to a transponder population comprising a plurality of transponders; and a receiver for receiving response signals from the transponder population;

the controller being operative to lock into a first part of a digital sequence being transmitted by one of said transponders;

the controller being operative to cause the transmitter to broadcast a mute signal immediately to mute all of said transponders not yet transmitting;

the controller further being operative to cause the transmitter to transmit a separate first command to cause said one of said transponders to transmit a second part of the digital sequence; and the controller causing the receiver to receive and read said second part of the digital sequence.

17. A transponder for an electronic radio frequency identification system, the transponder comprising;

a modulator for modulating a carrier with response signals;

a demodulator for demodulating command signals; and a controller for the modulator and demodulator;

the controller being sensitive to a mute command received from a reader and responsive thereto by muting the transponder, and if the mute command is not received, to cause the modulator to modulate the carrier with a first part only of a digital sequence;

the controller further being sensitive to a separate first command signal; and the controller also being responsive to said first command signal by causing the modulator to modulate the carrier with a second part of the digital sequence.

18. A method of reading a plurality of transponders forming part of an electronic identification system also comprising a reader, the method comprising the steps of:

causing the reader to lock onto a first part of a digital sequence being transmitted by one of said transponders;

while said one transponder is still transmitting said first part, causing the reader to broadcast a mute signal immediately to mute all of said transponders not yet transmitting;

causing the reader to transmit a separate first command to cause said one transponder to transmit a second part of the digital sequence; and receiving and reading said second part of the digital sequence at the reader.

19. An electronic radio frequency identification system comprising:

a reader;

a transponder population comprising a plurality of transponders to be read by the reader;

the reader comprising a controller, a transmitter for transmitting signals to the transponder population and a receiver for receiving response digital sequences from the transponder population;

the controller being operative to lock onto a first part of a digital sequence being transmitted by one of said transponders;

the controller being operative while said one transponder is still transmitting said first part, to cause the transmitter to broadcast a mute signal immediately to mute all of said transponders not yet transmitting;

the controller further being operative to cause the transmitter to transmit a separate first command to cause said one of said transponders to transmit a second part of the digital sequence; and the controller causing the receiver to receive and read said second part of the digital sequence.

20. A reader for an electronic radio frequency identification system comprising:

a controller; a transmitter for transmitting signals to a transponder population comprising a plurality of transponders; and a receiver for receiving response signals from the transponder population;

the controller being operative to lock onto a first part of a digital sequence being transmitted by one of said transponders;

the controller being operative while said one transponder is still transmitting said first part, to cause the transmitter to broadcast a mute signal immediately to mute all of said transponders not yet transmitting;

the controller further being operative to cause the transmitter to transmit a separate first command to cause said one of said transponders to transmit a second part of the digital sequence; and the controller causing the receiver to receive and read said second part of the digital sequence.

* * * * *